April 20, 1948.   K. J. DE JUHASZ ET AL   2,440,194
FUEL PUMP
Filed Jan. 29, 1946   5 Sheets-Sheet 1

Fig.1

INVENTORS
KALMAN J. DE JUHASZ
FREDERICK J. VILLFORTH, JR.
BY
ATTORNEY

Fig. 4

April 20, 1948.  K. J. DE JUHASZ ET AL  2,440,194
FUEL PUMP
Filed Jan. 29, 1946  5 Sheets-Sheet 5

INVENTORS
KALMAN J. DE JUHASZ
FREDERICK J. VILLFORTH, JR.
BY
ATTORNEY

Patented Apr. 20, 1948

2,440,194

UNITED STATES PATENT OFFICE 2,440,194

FUEL PUMP

Kalman J. De Juhasz, State College, Pa., and Frederick J. Villforth, Jr., Beacon, N. Y., assignors to The Texas Company, New York, N. Y., a corporation of Delaware Application January 29, 1946, Serial No. 644,032

20 Claims. (Cl. 103—41)

This invention relates to a fuel pump and timer mechanism for an internal combustion engine operating with fuel injection.

A principal object of the invention is to provide a novel fuel pump of this character capable of drawing fuel from a lower pressure source and supplying it to the injection line of the engine at a constant high injection pressure during the injection period on each cycle, and then reducing the fuel pressure in said injection line immediately at the termination of the injection period to avoid dribbling from the nozzle.

A further object is to provide a fuel pump and timer mechanism of the above character which also permits accurate control and adjustment of the injection advance and duration of injection during each cycle, even in the case of high speed engines.

Still another object of the invention is to provide a fuel pump and timer assembly which is compact and rugged and construction, reliable in operation, readily and simply adjusted to vary the injection advance and duration of injection, and capable of rapid or snap-action movement in initiating and terminating injection on each cycle, while at the same time accurately maintaining the fuel pressure control and the injection timing over long periods of service.

Other objects and advantages of the invention will be apparent from the following description when taken in conjunction with the appended claims and the attached drawing.

A preferred embodiment of the invention is illustrated in the drawing, wherein.

As illustrated in the drawing, fuel is supplied from a lower pressure source of supply through pipe 21 to the pump and timer assembly indicated generally by the numeral 22. The latter serves to supply fuel under a constant high pressure during the injection period on each cycle through injection line 23, which is adapted to lead to the conventional injection nozzle for injecting fuel into the combustion space of the engine cylinder. The pump and timer assembly 22 controls the beginning and end of injection, as well as maintaining a constant high injection pressure in the fuel injection line 23 during the injection period; and also serves to release the pressure in fuel line 23 immediately at the end of the injection period, whereby the customary pintle valve in the injection nozzle of the engine is adapted to slam shut on its seat to prevent dribbling of fuel from the nozzle tip.

The pump and timer assembly 22 comprises a crank-case 80 and a cylinder block 81 which are bolted together by bolts 82. Crankcase 80 is provided with opposed cover plates 83 and 84 providing access to the interior of the oil reservoir 85. Plate 84 is provided with a drain plug 86. A screw plug 95 closes the upper end of a passage (not shown) drilled through blocks 80 and and 81, which enables the reservoir 85 to be supplied with lubricating oil. Crankcase 80 is also provided with end cover plates 87 and 88 containing oil seals 89 for a camshaft 90 which is adapted to be interconnected with the engine in any suitable manner to be driven at camshaft speed, which is one-half the engine speed for four-cycle operation. Camshaft 90 is mounted on ball bearings 91, and carries within oil reservoir 85 three cams indicated by the numerals 92, 93 and 94 respectively. Cams 92 and 94 are identical in contour, and are displaced 90 angular degrees apart for a purpose hereinafter described.

Cylinder block 81 is provided with a threaded opening receiving a pipe pressure fitting 97 to which is connected line 21 leading to the low pressure fuel supply. The cylinder block 81 is drilled to form a channel 98 (Fig. 2) communicating with branch bores 99 and 100 respectively, which latter supply pumping units 101 and 102 respectively. These pumping units operate in parallel to supply fuel from the low pressure source to a storage reservoir 103 (Fig. 1) maintained under the desired constant high fuel pressure employed for fuel injection.

Figure 2:
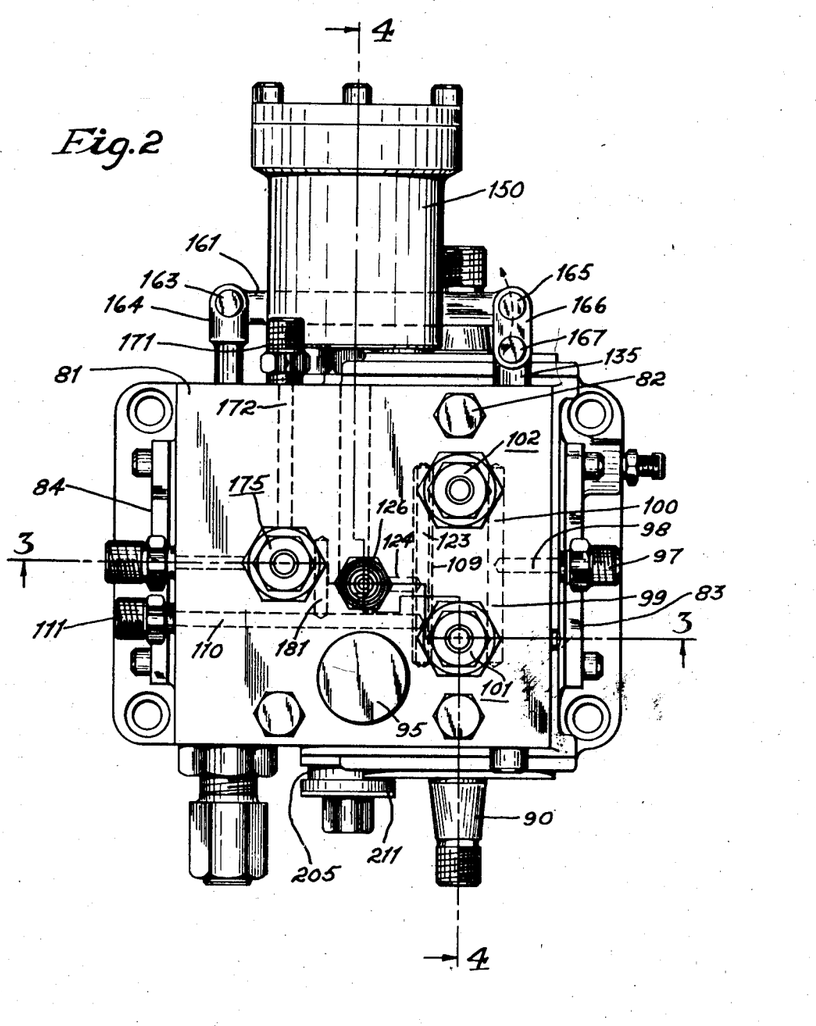
Fig. 2 is a top plan view of the pump and timer assembly.
Figure 3:
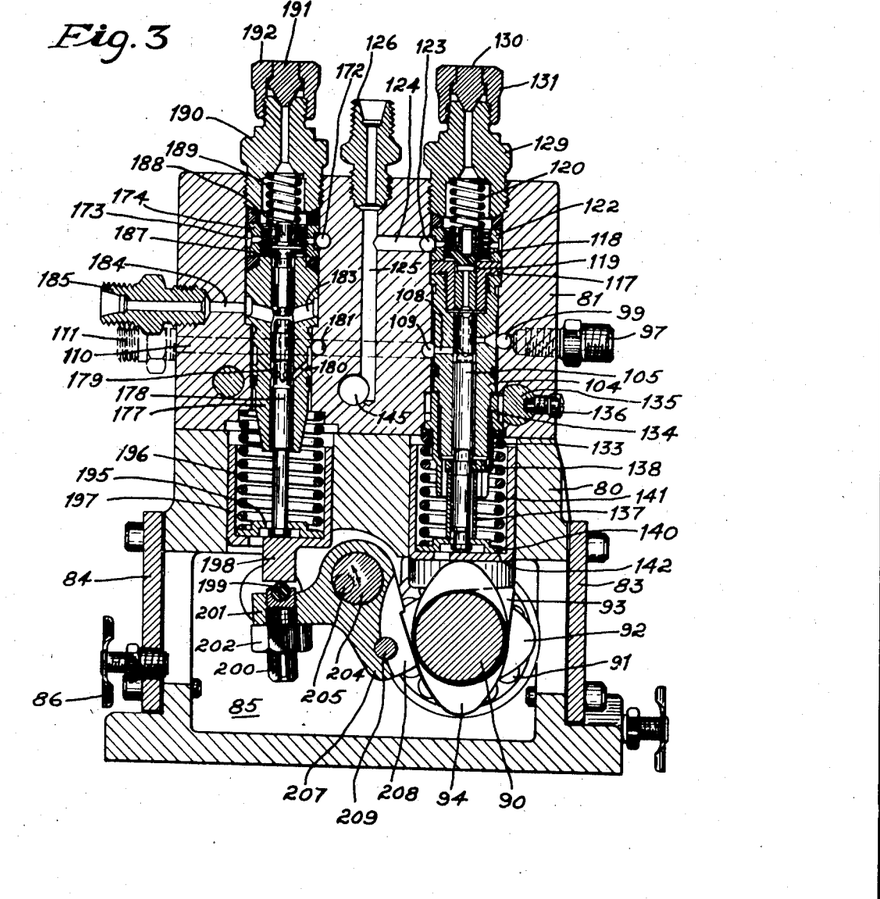
Fig. 3 is a vertical sectional view taken on the plane of the line 3—3 of Fig. 2.
Figure 4:
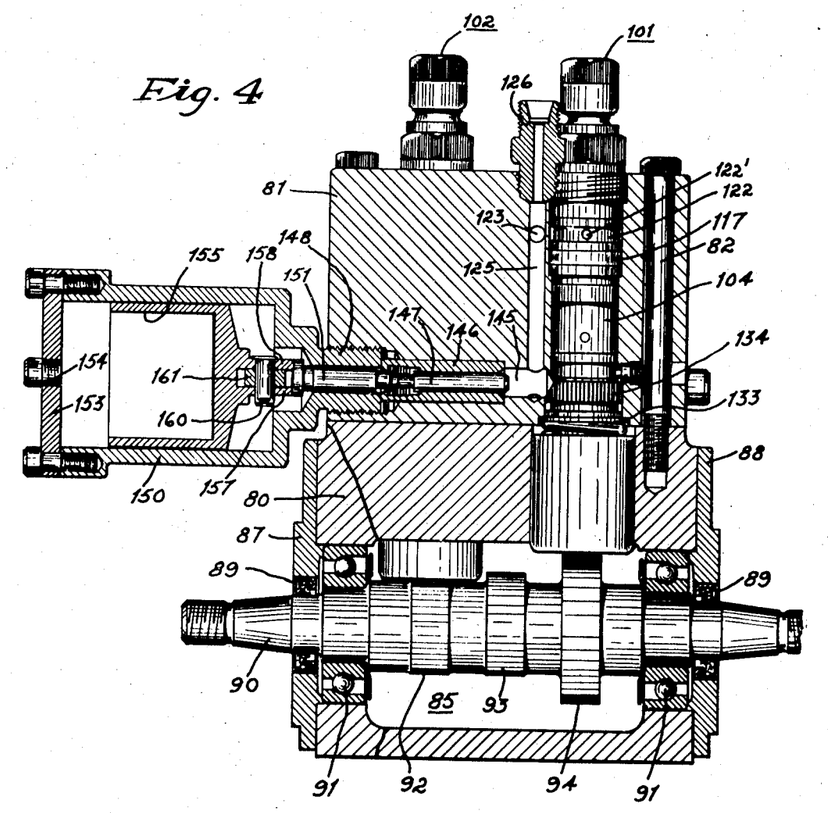
Fig. 4 is a vertical sectional view taken on the plane of the line 4—4 of Fig. 2.
Figures 5, 6:
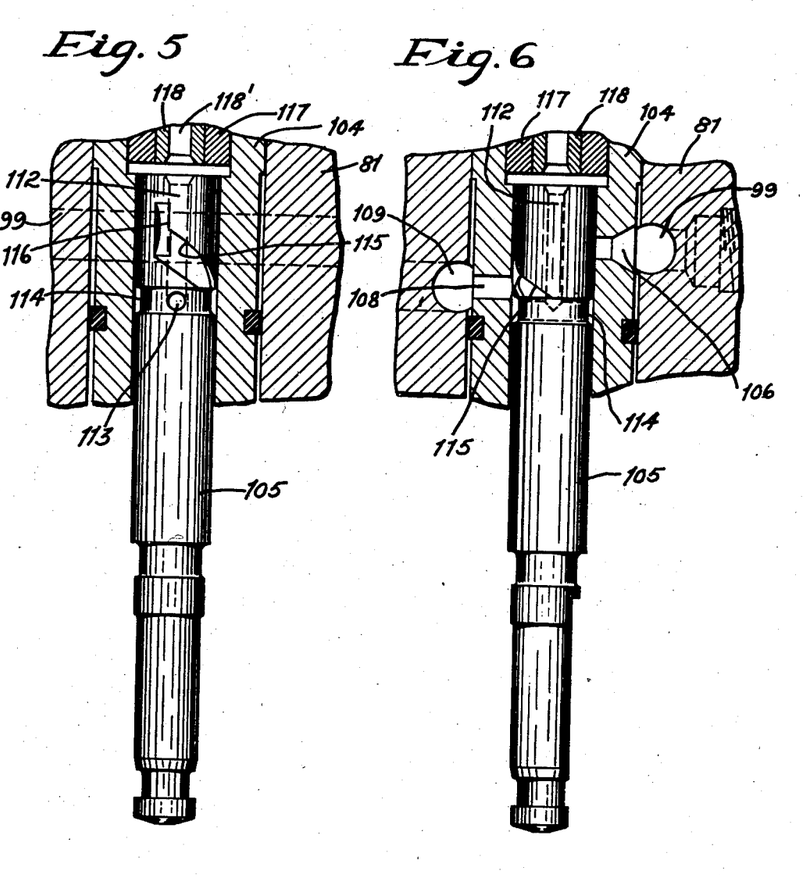
Fig. 5 is a partial, vertical, sectional view on an enlarged scale of one of the pumping cylinders, with the associated pump plunger shown in elevation, the view being taken at right angles to that of Fig. 3.
Fig. 6 is a view similar to Fig. 5, but taken in the plane of Fig. 3 and at right angles to that of Fig. 5.

The pumping units are of identical construction, and unit 101 is illustrated in cross-section in Fig. 3 and in elevation in Fig. 4. Enlarged detailed views of a portion thereof are shown in Figs. 5 and 6. This pumping unit comprises a pump cylinder 104, within which operates a plunger 105. Cylinder 104 is provided with an inlet port 106 communicating with bore 99, through which fuel is fed into the interior of the pump cylinder on the down or suction stroke of the plunger 105. Somewhat below the elevation of inlet port 106, cylinder 104 is formed with a spill port 108 communicating with cross channel 109 formed in the cylinder block 81, the cross channel 109 also extending to the corresponding spill port of pump unit 102 (Fig. 2). Leading off from the cross channel 109 is a passageway 110 which communicates with pipe fitting 111, to which is fastened fuel line 112 leading back to the source of low pressure fuel supply.

Plunger 105 is formed with an interior axial bore 112 leading from the upper end to radial ports 113 communicating with an annular channel 114 formed by a circular groove about the plunger. The latter is shown in Figs. 3 and 6 immediately below the level of the spill port 108, the plunger being shown in its upper dead center position in this view. The plunger is also formed with an inclined groove providing a helix 115 extending slightly more than 90° about the circumference thereof from an upper vertical groove 116 down to the annular channel 114, and adapted to cooperate with the spill port 108 to control the amount of fuel supplied to the high pressure reservoir 103 on each working stroke.

Figure 1:
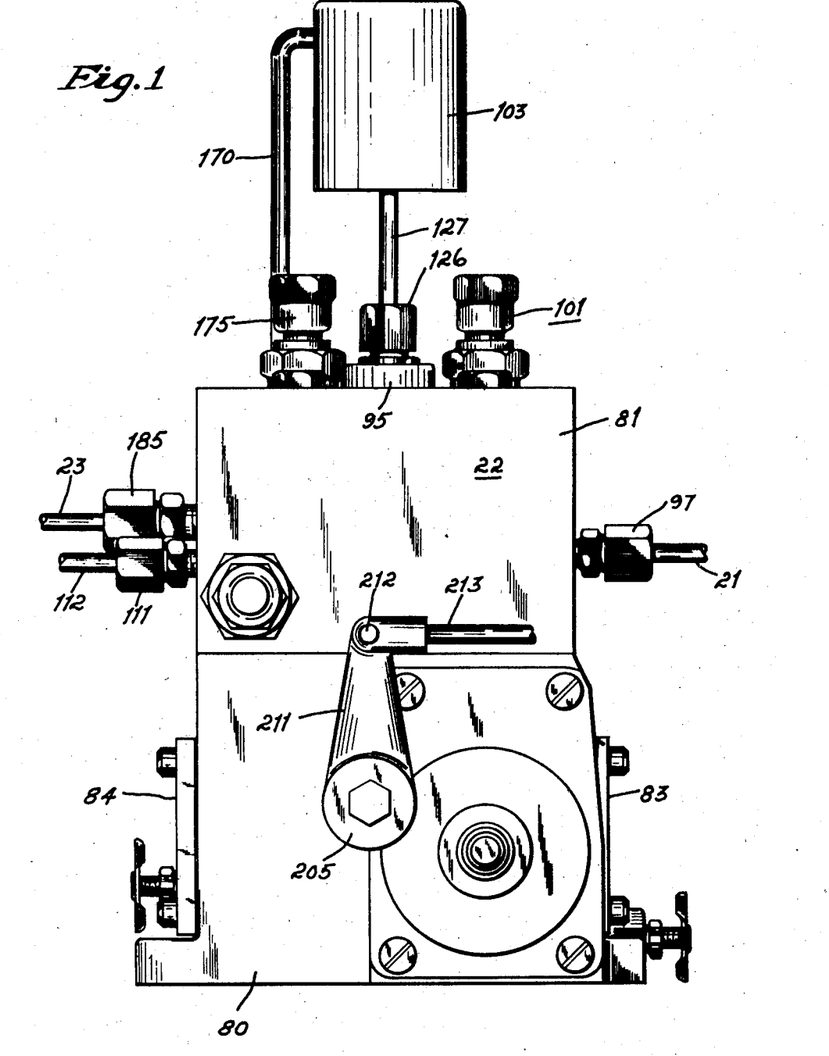
Fig. 1 is a side elevational view of the pump and timer assembly with high pressure fuel reservoir connected thereto.

Carried by the upper end of cylinder 104 is a check valve housing 117 carrying a check valve 118 having a depending stem slidingly disposed within the check valve body and drilled to form a vertical channel 118' communicating with the pump cylinder above the plunger, the upper end of the vertical channel 118' being in turn connected by radial ports with an annular fuel chamber 119. On the working stroke of plunger 105, fuel under high pump pressure is forced into the annular chamber 119 where it acts on the inclined surface of the check valve and raises it from its seat against the action of spring 120. The lower end of the spring is mounted about a central extension of check valve 118, the spring bearing on the upper face of the check valve. Surrounding the upper portion of check valve 118 and the lower portion of spring 120 and spaced therefrom is a fuel passage collar 122 provided with radial ports 122' opening into an annular channel communicating with the high pressure cross bore 123 formed in cylinder block 81. This cross bore 123 is above and in approximate alignment with the cross bore 109, as shown in Fig. 2, and provides communication of both pumping units with the high pressure discharge channel 124 opening into a vertical channel 125. The upper end of channel 125 communicates with pipe fitting 126 to which is connected line 127 leading to high pressure storage reservoir 103 (Fig. 1). The upper end of the pumping unit is closed by a fitting 129 having a sealing block 130 held in place by sleeve nut 131.

The lower end of pump cylinder 104 receives a sleeve 133 which is free to rotate about the cylinder. The upper end of sleeve 133 carries a spur gear 134 meshing with rack 135 which is slidably mounted for horizontal longitudinal movement within a bore formed in cylinder block 81. A cap screw 136 threaded in the block 81, carries an extension riding in a slot in rack 136, thus maintaining the parts in proper alignment. The lower end of plunger 105 has rigidly fastened thereto a sleeve 137 provided with a lug 138 extending through a slot in the depending portion of sleeve 133, so that rotation of sleeve 133 causes corresponding rotative movement of plunger 105 within the cylinder 104. This changes the position of helix 115 with respect to the spill port 108, and consequently varies the quantity of fuel supplied to the high pressure source on each working stroke. The lower end of plunger 105 carries a spring retainer 140 receiving spring 141, the upper end of which bears against a shoulder carried by sleeve 133. A cam follower 142 is slidably mounted within a suitable bore in the crankcase 80, and is cup-shaped to receive the lower end of the plunger, the spring 141 and related parts. Spring 141 forces the cam follower to ride on the cam 94 with the desired pressure.

As shown in Fig. 3, cam 94 (as well as cam 92 which is of identical shape) is formed with two lobes to provide two working strokes for each rotation of the cam-shaft. As shown in Figs. 3 and 4, cams 92 and 94 are arranged 90° apart, so that the pumping strokes of units 101 and 102 occur alternately. Each of the pumping units is automatically controlled through rack 135 to maintain a predetermined high fuel pressure within the reservoir 103. This is accomplished in the following manner:

The vertical channel 125 communicates at its lower end with a passage 145 constituting a plunger pressure chamber. Mounted within said passage 145 is a plunger cylinder 146 slidably receiving a plunger 147. At the outer end of passage 145, there is threaded into block 81 and extension 148 of a pressure control cylinder 150. Extension 148 has an interior machined bore within which is slidably mounted a second plunger or sliding rod 151. Plunger 147 is provided with a bearing cap at the left hand end thereof (Fig. 4) which engages the rounded end portion of plunger 151. It will be understood that the fuel pressure within reservoir 103 is communicated through pipe 127 and passage 125 to pressure chamber 145, and acts on the exposed end of plunger 147, tending to force the plungers 147 and 151 to the left as shown in Fig. 4.

Pressure control cylinder 150 is provided with a cover plate 153 having a threaded opening 154 adapted to receive a pipe connection leading to a source of fluid under constant pressure. For example, air supplied by a suitable compressor, is forced through a pressure regulating valve (not shown) into a suitable air reservoir, where it is maintained at the desired constant pressure; and this air then passes through a check valve in the pipe connection fastened to opening 154 and thence into the interior of pressure regulating cylinder 150 where it acts on piston 155. The latter is slidably mounted within cylinder 150 so that the air pressure tends to move the piston to the right as shown in Fig. 4. Piston 155 is provided with spaced lugs 157 and 158, the ends of which bear against the head of plunger 151. Consequently, the air pressure within cylinder 150 on the left hand or interior side of piston 155 acts against and is normally substantially balanced by the fuel pressure in chamber 145 acting against the face of plunger 147. It will be understood that a very high fuel pressure acting on the comparatively small area of the exposed face of plunger 147 can be balanced by a relatively low and conveniently supplied air pressure acting on the much greater cross-sectional area of piston 155.

Instead of the construction shown including the source of constant air or other fluid pressure, piston 155 and cylinder 150, it will be understood that a suitable spring with adjustable compression can be employed to counteract the thrust of the fuel pressure on the plunger. However, where an air compressor or other convenient source of low pressure fluid is available, the construction shown is preferred, since it is readily maintained in accurate operating condition over long periods of time, and is not subject to wear and variation in compression for a given setting as is the case with a spring.

Loosely pinned between lugs 157 and 158 by pin 160 is a lever 161. The latter, as shown in Fig. 2, extends through suitable slots in the opposite sides of cylinder 150 beyond the normal range of travel of piston 155. Some air leakage between piston 155 and cylinder 150 may occur, this leakage escaping to atmosphere through the said slots. This is unobjectionable since a reservoir of sufficient capacity can be provided to maintain the air pressure within cylinder 150 substantially constant for any given position of piston 155. Necessary makeup air for this purpose is supplied to the reservoir through the mentioned pressure regulating valve from the compressor or other source of supply. One end of lever 161 is pivoted at 163 to a stud or post 164 extending outwardly from block 81. The other end of lever 161 is pivoted at 165 to a short link 166, which in turn is pivoted at 167 to the end of rack 135. As shown in Fig. 4, pin 160 rides loosely within a longitudinal slot formed in lever 161 to permit swinging movement of said lever about its pivot 163 upon longitudinal movement of piston 155 within cylinder 150.

It will thus be seen that, if the pumping units 101 and 102 are operating to supply fuel to reservoir 103 at a rate faster than fuel is supplied by line 23 to the engine, which causes an increase in fuel pressure in reservoir 103 and also in pressure chamber 145, this will cause movement of piston 155 to the left (Fig. 4). Since the above-mentioned check valve in the air supply line to cylinder 150 opens one way only to permit flow of air to cylinder 150 but prevents reverse flow of air, the air pressure within cylinder 150 will increase upon this movement of piston 155 and eventually balance the increased fuel pressure in chamber 145. Movement of the piston 155 to the left swings lever 161 about pivot 163, so that the opposite end of lever 161 pivoted at 165 swings in a counter-clockwise arc as shown in Fig. 2. This movement through the interconnecting link 166 will slide rack 135, so that said rack moves upwardly as shown in Fig. 2 or away from the observer as shown in Fig. 3. This movement of rack 135 rotates the spur gears 134 of the pumping units 101 and 102 in a counterclockwise direction (Fig. 2), thereby bringing a higher portion of each helix 115 of the plungers 105 opposite the respective spill ports 108. Consequently, on the up or working stroke of each plunger 105, the inclined groove formed in the plunger will be brought into registration with spill port 108 at an earlier period in the cycle. At this moment, fuel trapped under the high supply pressure above plunger 105 is permitted to escape through the axial bore 112, radial ports 113, annular groove 114 and inclined groove to the spill port 108, and thence return by passage 109, channel 110 and line 112 to the low pressure fuel supply. The net result is a decrease in the amount of fuel supplied to reservoir 103 by the pumping units on each working stroke, resulting in a drop in pressure in fuel chamber 145 and reservoir 103. The excess air pressure behind the piston 155 in cylinder 150 then moves piston 155 and the associated plungers 151 and 147 to the right (Fig. 4), to restore the parts to normal position and maintain the predetermined fuel pressure in reservoir 103.

Conversely, if the pumping units 101 and 102 are supplying insufficient fuel to satisfy the engine demand, the pressure in reservoir 103 and fuel chamber 145 drops, and the air pressure within cylinder 150 then moves piston 155 to the right. This causes a reverse movement of lever 161 and rack 135 from that previously described, and rotates the sleeves 133 and plungers 105 in a clockwise direction (Fig. 2), thereby bringing a lower portion of each helix 115 opposite its respective spill port 108. The pumping units 101 and 102 then supply an increased quantity of fuel on each working stroke to maintain the fuel pressure within reservoir 103 substantially constant. It will be understood that the size of reservoir 103 as shown in Fig. 1 is substantially smaller than is actually employed, this being done as a matter of convenience in illustration. Actually, the reservoir 103 may be several times the size of the pump and timer assembly 22 as shown in this figure. It will be seen that the pumping units 101 and 102 and the fluid pressure control cylinder 150 serve to automatically maintain a supply of fuel in reservoir 103 under a substantially constant high injection pressure during the operation of the engine. However, these units do not control the beginning and duration of fuel injection. The latter is accomplished by the timer mechanism of assembly 22 which will now be described.

Referring to Fig. 1, reservoir 103 is connected by fuel feed line 170 to pipe connection 171 (Fig. 2) mounted on the side of block 81. This in turn communicates with fuel channel 172 (Figs. 2 and 3) opening into an annular chamber 173 (Fig. 3) formed in the fuel passage collar 174 of the timer mechanism indicated generally at 175. This mechanism is shown in cross-section in Fig. 3. A cylinder 177 rigidly carried by block 81 receives a plunger 178. The latter is provided with a circular groove forming a portion of smaller exterior diameter 179. This provides a fuel chamber adapted to communicate with the upwardly inclined passages 180 drilled through cylinder 177 and which open into a spill port 181 formed in block 81. As shown in Fig. 2, said spill port 181 comprises a short passage communicating with channel 110, thus leading the discharged fuel through pipe fitting 111 and line 112 back to the source of low pressure fuel supply.

Above spill port 181, sleeve 177 is drilled to form radial ports 183 which communicate with a passage 184 in block 81 leading to pipe fitting 185. As shown in Fig. 1, fuel line 23 leading to the engine is connected to said fitting 185. Formed on sleeve 177 is a valve seat 187 for a check valve 188 normally held on its seat by spring 189. The valve seat 187 is within the lower portion of the fuel passage collar 174, which latter bears against a packing ring surrounding the upper end of sleeve 177. A fitting 190 threaded in block 81 clamps a second packing ring against the upper surface of collar 174 and maintains the parts in assembled relationship. The outer end of fitting 190 is sealed by plug 191 held in place by sleeve nut 192.

Fuel from chamber 173 passes through radial ports in collar 174 to the space above check valve 188. It will be noted that the check valve has an upwardly extending central portion which is surrounded by the lower end of spring 189, the latter bearing at its lower end against the top face of the check valve and at its upper end against the fitting 190. The check valve 188 is also provided with a downwardly extending stem carrying guiding fins, the lower end of said stem being shown in Fig. 3 as terminating opposite the radial ports 183. In this same view, the upper end of plunger 178 is shown as about even with the lower side of said radial ports 183 and spaced somewhat from the lower end of the check valve stem. This upper end of plunger 178 is drilled to provide an axial channel communicating at its lower end with radial ports which are shown in registration with the ports 180 in sleeve 177 leading to spill port 181. Thus, as shown in Fig. 3, channel 184 and consequently the fuel supply line 23 (Fig. 1) is open to the low pressure fuel supply through ports 183, the axial bore and radial ports formed in the top of plunger 178, ports 180, spill port 181, channel 110, and line 112. This means that the fuel pressure in line 23 has dropped to the low pressure of the main supply from line 21, and consequently fuel injection has been terminated.

Initiation of the injection on the succeeding cycle is accomplished by upward movement of plunger 178 to contact the depending stem of check valve 188 to raise the latter from its seat 187. The construction is such that the depending stem of the check valve first seals the axial bore at the upper end of plunger 178, thereby preventing fuel flowing from ports 183 to the spill port 181. Further upward movement of plunger 178 raises check valve 188 from its seat, and allows high pressure fuel from the space above the check valve, and consequently from reservoir 103, to flow downwardly through the fluted passageway about the depending check valve stem to ports 183 and thence by channel 184 to fuel line 23. This immediately raises the pressure in fuel line 23 to the constant injection pressure to start fuel injection.

Termination of fuel injection on each cycle is accomplished by causing plunger 178 to move downwardly to seat check valve 188, and then withdrawing the top of the plunger from the depending check valve stem, thereby opening communication between fuel line 23 and the spill port 181 as previously described to immediately drop the pressure in the fuel line 23 to the lower pressure of the main fuel supply.

For high speed internal combustion engines, a very rapid or snap movement of the timer plunger 178 is required. This is accomplished by the mechanism now described. As shown in Fig. 3, the lower end of plunger 178 carries a spring retainer 195 which receives the lower portion of a spring 196, the upper portion of which bears against block 81. Surrounding the lower portion of spring 196 is a cup-shaped cam follower 197 slidably mounted within a machined bore in crank case 80. The underside of follower 197 carries a depending lug 198 held in engagement by spring 196 with a hardened steel bearing ball 199 mounted in the upper end of a bolt 200 threaded in the arm 201 of a bell crank lever. Bolt 200 is locked in adjusted position by lock nut 202.

The said bell crank lever is rotatably mounted on eccentric journal 204, the latter protruding eccentrically from a shaft 205 rotatably mounted in a sleeve bearing carried by crank case 80. Shaft 205 is indicated in dotted lines in Fig. 3, and the outer end of said shaft which protrudes to the exterior of the crank case 80 is shown in Figs. 1 and 2. The second arm 207 of said bell crank lever is formed with spaced forks 208, one of which is shown in elevation in Fig. 3. Referring to Fig. 4, the spaced forks 208 are adapted to straddle cam 93 and to bear on the circular portions of cam shaft 90 on opposite sides of said cam 93. Also carried by said lever arm 207 and extending between said spaced forks 208 is a bearing pin 209 adapted to contact the rise of cam 93.

With the cam 93 in the position shown in Fig. 3, it will be seen that the forks 208 are then riding on the circular portion of cam shaft 90 and timer plunger 178 is in its lower-most position. The rise of cam 93 is relatively steep. Consequently, as cam shaft 90 rotates, this rise is brought into contact with bearing pin 209, and due to the steepness of the rise, a very quick clockwise rocking movement of lever 201–207 results, causing a fast upward movement of timer plunger 178 to initiate injection at the proper point in the cycle. Likewise, the slope of cam 93 on the descending side is also steep, producing a rapid lowering movement of timer plunger 178 to terminate fuel injection.

The duration of fuel injection is varied by rotation of shaft 205 within its bearing in crank case 80, and this is under the control of the throttle. As shown in Figs. 1 and 2, a lever 211 is rigidly fastened to the outer exposed end of shaft 205. Pivotally connected at 212 to the end of lever 211 is a rod 213 which leads to the usual throttle control located at the operator's compartment. Due to the eccentric mounting of pin 204 in shaft 205, rotation of shaft 205 will cause movement of the center of pin 204 toward or away from cam shaft 90 on an arc indicated by the arrow in Fig. 3. As this occurs, depending sides of forks 208 slide along cam shaft 90 and continue to bear thereon, and bearing pin 199 slides along the broad bearing surface of depending lug 198 and also maintains engagement therewith. However, bearing pin 209 is at the same time moved either closer to or farther away from the center of cam shaft 90. Rotation of throttle lever 211 in a counter-clockwise direction (Fig. 1) will move bearing pin 209 farther away from the center of cam shaft 90. This means that the rise of cam 93 will contact pin 209 later in the cycle, and likewise, the descending side of cam 93 will leave pin 209 earlier in the cycle. Duration of fuel injection is thus shortened by starting injection later and terminating injection earlier in the cycle. Conversely, rotating throttle lever in a clockwise direction (Fig. 1) will move bearing pin 209 closer to the center of cam shaft 90, and thereby increase the duration of fuel injection by starting injection earlier and terminating injection later in the cycle.

From the above description, it is seen that the fuel pump and timer assembly 22 accomplishes several functions. It controls the beginning and end of fuel injection in each cycle, and enables the duration of fuel injection to be varied in accordance with the load on the engine. Further, it maintains a substantially constant high fuel pressure within the fuel line 23 during the period of fuel injection, which pressure is sufficiently high to initiate opening movement of a conventional spring-pressed pintle valve in the fuel injection nozzle. Finally, it immediately drops the fuel pressure in line 23 to a lower value which causes the pintle valve to slam shut on its seat to terminate fuel injection, and maintains that lower fuel pressure in line 23 until the start of injection on the succeeding cycle.

While the construction shown, wherein the time in the cycle at which injection starts and the time in the cycle at which injection terminates are both varied in accordance with the load on the engine, constitutes a preferred arrangement, it will be understood that other arrangements can be employed. Thus, the time in the cycle of initiating injection can be maintained substantially constant, and the duration of injection regulated by varying the time of terminating injection, or vice versa.

It will be understood that the relative location of the pivot pin 204 with respect to the cam shaft 90, as well as the eccentricity of pin 204 with respect to the center line of shaft 205, can be varied to suit the particular installation and the operating characteristics of injection advance and duration of injection desired. Likewise, the contour of cam 93 can be varied and coordinated with the mounting of lever 201—207 to alter these injection characteristics. Additional control and ease of adjustment is afforded by the bearing pin 199 carried by the adjustable bolt 200, which latter is readily accessible upon removal of cover plate 84. Thus, adjusting bearing pin 199 downwardly as shown in Fig. 3 serves to move the upper end of timer plunger 178 farther away from the lower end of the depending stem of check valve 188. Consequently, for any given setting of shaft 205, this will initiate injection later in the cycle and terminate injection earlier in the cycle, with a net reduction in the duration of injection on each cycle. The upper limit of adjustment of bearing pin 199 is determined by that setting which just removes the lower end of the check valve stem from sealing engagement within the upper end of the axial passage of the timer plunger 178. This position is maintained throughout the major portion of the cycle by the spaced forks 208 riding on the circumference of the circular portion of the cam shaft 90; and it is only during the brief interval on each cycle when the single rise having steep sides of cam 93 contacts bearing pin 209 and rocks the lever with spaced forks 208 away from the surface of the circular cam shaft that the injection period occurs.

The fuel pump and timer assembly of the present invention is particularly adapted for use in connection with an engine operating with non-knocking combustion, wherein combustion is initiated by spark ignition promptly after the start of injection to form a flame front, and injection is then continued into localized portions of the combustion space in advance of the flame front, as disclosed and claimed in the copending application of Everett M. Barber, Serial No. 513,232, filed December 7, 1943, now abandoned. Moreover, the present invention is particularly useful for an engine of this character equipped with a control to vary the rate of fuel injection in accordance with the fluid density within the combustion space during the injection period, as disclosed and claimed in the copending application of Everett M. Barber and Jay B. Malin, Serial No. 623,098, filed October 18, 1945.

Obviously many modifications and variations of the invention, as hereinbefore set forth, may be made without departing from the spirit and scope thereof, and therefore only such limitations should be imposed as are indicated in the appended claims.

We claim:

1. A fuel pump and timer assembly for an internal combustion engine operating with fuel injection and having a fuel injection line, comprising a pump block having a pump cylinder and a plunger operating therein, an inlet from a source of low pressure fuel supply communicating with said pump cylinder, a high pressure fuel storage chamber, an outlet from said pump cylinder communicating with said storage chamber, said pump block also having a timer cylinder and a plunger operating therein, an inlet to said timer cylinder communicating with said storage chamber, an outlet from said timer cylinder adapted to be connected to said fuel injection line of the engine, a spill port from said timer cylinder communicating with a return line to said low pressure fuel supply, a cam shaft mounted in said pump block, operative interconnections between said cam shaft and said pump and timer plungers, means for automatically controlling the operation of said pump plunger to regulate the supply of fuel from said low pressure source to said storage chamber to maintain a predetermined substantially constant high pressure of fuel within said storage chamber, and means associated with said timer plunger for controlling the beginning of injection on each cycle by connecting said timer cylinder inlet to said timer cylinder outlet while closing said spill port to thereby provide fuel flow from the storage chamber to the fuel injection line at the substantially constant high fuel pressure, and for regulating the end of injection on each cycle by connecting said spill port with said timer cylinder outlet while closing said timer cylinder inlet to thereby immediately reduce the fuel pressure in said fuel injection line to a substantially lower value.

2. A fuel pump and timer assembly according to claim 1, wherein said operative interconnection between said cam shaft and said pump plunger includes a cam directly engaging a cam follower attached to said pump plunger, and the operative interconnection between said cam shaft and said timer plunger includes a second cam operating through a pivoted lever on a cam follower of said timer plunger, said parts being constructed and arranged to provide a snap-action movement of said timer plunger.

3. A fuel pump and timer assembly according to claim 1, wherein the operative interconnection between said cam shaft and timer plunger includes a cam with a rise having steep sides, a lever having an arm provided with spaced forks adapted to ride on said cam shaft on opposite sides of said cam, a bearing pin carried between said spaced forks and adapted to be engaged by said cam rise to rock said lever with a snap-action movement, a cam follower carried by said timer plunger and having a broad bearing surface, an adjustable bearing tip carried by the other arm of said lever and engaging said broad bearing surface, an eccentric journal carried by a shaft mounted in said pump block and providing a pivot for said lever, and means for rotating said shaft to thereby move said eccentric journal in an arc to adjust the position of said bearing pin with respect to said cam to alter the duration of injection on each cycle.

4. A fuel pump and timer assembly according to claim 1, wherein the means for automatically controlling the operation of said pump plunger comprises a spill port formed in said pump cylinder and communicating with said return line to the low pressure fuel supply, a helix on said pump plunger cooperating with said spill port, means for rotating said pump plunger to adjust the time in the pumping stroke of said plunger when said helix opens said spill port to terminate supply of fuel through said pump outlet to said storage chamber, a control piston movable in response to changes in fuel pressure in said storage chamber, and operative interconnections between said piston and said means for rotating the pump plunger to regulate the angular position of said pump plunger in accordance with the position of said piston.

5. A fuel pump and timer assembly according to claim 1, wherein the means for automatically controlling the operation of said pump plunger comprises a spill port formed in said pump cylinder and communicating with said return line to the low pressure fuel supply, a helix on said pump plunger cooperating with said spill port, means for rotating said pump plunger to adjust the time in the pumping stroke of said plunger when said helix opens the said spill port to terminate the supply of fuel through said pump outlet to the said storage chamber, a pressure chamber formed in said pump block and communicating with said storage chamber to receive fuel under said high fuel pressure, a piston mechanism including a piston slidably mounted in said pump block and having an end of relatively small cross-sectional area exposed to the high pressure of fuel in said pressure chamber, means opposing movement of said piston in response to the force exerted by the high fuel pressure on the end of said piston and normally holding the piston in an equilibrium position at said predetermined constant fuel pressure, and operative interconnections between said piston mechanism and said means for rotating the pump plunger to regulate the angular position of said pump plunger in accordance with the position of said piston.

6. A fuel pump and timer assembly according to claim 1, wherein the means for automatically controlling the operation of said pump plunger comprises a spill port formed in said pump cylinder and communicating with said return line to the low pressure fuel supply, a helix on said pump plunger cooperating with said spill port, means for rotating said pump plunger to adjust the time in the pumping stroke of said plunger when said helix opens the said spill port to terminate the supply of fuel through said pump outlet to the said storage chamber, a pressure chamber formed in said pump block and communicating with said storage chamber to receive fuel under said high fuel pressure, a piston slidably mounted in said pump block and having an end of relatively small cross-sectional area exposed to the high pressure of fuel in said pressure chamber, a fluid pressure cylinder, a second piston of relatively large cross-sectional area slidably mounted in said fluid pressure cylinder and operatively engaging the other end of said first-mentioned piston, means adapted to connect said fluid pressure cylinder with a source of fluid under a substantially constant pressure which is lower than said high fuel pressure, whereby the force of the lower fluid pressure on said second piston of relatively large cross-sectional area balances the force of said high fuel pressure on said first piston of relatively small cross-sectional area and holds the parts in equilibrium at said predetermined high fuel pressure, and operative interconnections between said pistons and said means for rotating the pump plunger to regulate the angular position of said pump plunger in accordance with the positions of said pistons.

7. A fuel pump and timer assembly according to claim 1, wherein the means associated with said timer plunger for controlling the beginning and end of injection comprises a check valve normally closing communication between said timer cylinder inlet and outlet, said timer plunger having an axial passage normally providing communication between said timer cylinder outlet and spill port, and a stem carried by said check valve adapted to seat within and seal said axial passage at the beginning of the injection stroke of said timer plunger to close communication between said timer cylinder outlet and spill port, and then to open said check valve on further movement of the timer plunger on its injection stroke to provide communication between said timer cylinder inlet and outlet.

8. A fuel pump and timer assembly according to claim 1, wherein the pump block is provided with two pump cylinders with pump plungers of similar construction connected in parallel to force fuel from said low pressure source to said high pressure fuel chamber, and the cam shaft is provided with two cams having rises of similar contour for operating said pump plungers, said cams being angularly displaced on said cam shaft so that said pump plungers operate alternately.

9. A fuel pump and timer assembly according to claim 1, wherein the pump block is provided with two spaced pump cylinders and pump plungers of similar construction mounted in alignment with said cam shaft and connected in parallel to force fuel from said low pressure source to said high pressure fuel chamber, the said timer cylinder with timer plunger being mounted in said pump block intermediate said two spaced pump cylinders and being offset from said cam shaft, the latter being provided with a cam having one rise with steep sides for the snap-action operation of said timer plunger once on each rotation of the cam shaft, and the latter also being provided with two additional cams of similar contour on opposite sides of said first-mentioned cam, each of the two additional cams having two rises with less steep sides, and with the two rises of one cam angularly displaced by 90° from the corresponding two rises of the other cam, whereby the pump plungers operate alternately with each having two working strokes on each rotation of the cam shaft.

10. A fuel pump and timer assembly for an internal combustion engine operating with fuel injection and having an injection line, comprising a pump block, a high pressure fuel chamber, a pump cylinder with pump plunger mounted in said block and connected to force fuel from a low pressure source to said high pressure fuel chamber, a timer cylinder with timer plunger mounted in said pump block and connected to control the supply of fuel from said high pressure fuel chamber to said injection line, driving means in said pump block for reciprocating said pump plunger and said timer plunger, means associated with said timer plunger for regulating the beginning and duration of supply of fuel from said high pressure fuel chamber to said injection line on each cycle, said means being constructed and arranged to close communication between said fuel chamber and said injection line and maintain a substantially lower fuel pressure in said injection line during the balance of each cycle, and means associated with said pump plunger and responsive to fuel pressure within said high pressure fuel chamber for automatically regulating the supply of fuel from said low pressure source to said high pressure fuel chamber to maintain a predetermined substantially constant pressure of fuel in the latter.

11. A fuel pump and timer assembly for an internal combustion engine operating with fuel injection and having an injection line, comprising a pump block, a high pressure fuel chamber, two spaced pump cylinders having pump plungers mounted in said block and connected in parallel to force fuel from a low pressure source to said high pressure fuel chamber, a timer cylinder having a timer plunger mounted in said pump block and connected to control the supply of fuel from said high pressure fuel chamber to said injection line, a cam shaft for said pump block having spaced cams constructed to reciprocate said pump plungers alternately and with two working strokes each on every complete rotation of said cam shaft, additional means in said pump block for reciprocating said timer plunger, means associated with said timer plunger for regulating the beginning and duration of supply of fuel from said high pressure fuel chamber to said injection line on each cycle, said means being constructed and arranged to close communication between said fuel chamber and said injection line and maintain a substantially lower fuel pressure in said injection line during the balance of each cycle, and a common control means associated with said pump plungers and responsive to fuel pressure within said high pressure fuel chamber for automatically regulating the quantity of fuel supplied on each working stroke of said pump plungers to maintain a predetermined substantially constant pressure of fuel in the said high pressure fuel chamber.

12. In a fuel pump and timer mechanism of the character described, a pump block, a timer cylinder mounted therein, said parts being formed with an inlet communicating with a high pressure fuel supply, an outlet communicating with an injection line, and a spill port communicating with a return line to a low pressure fuel source, a check valve normally closing communication between said inlet and said outlet, a timer plunger within said cylinder having an axial passage normally providing communication between said outlet and said spill port, a stem on said check valve normally spaced from the adjacent end of said plunger containing the said axial passage when said plunger has completed its working stroke, the adjacent ends of said stem and plunger being formed to provide a valve and valve seat respectively to seal said axial passage on the working stroke of said plunger, and means for reciprocating said plunger to first seal said axial passage and then open said check valve on the working stroke of said plunger.

13. Apparatus according to claim 12, wherein said means for reciprocating the plunger comprises a cam shaft, a cam thereon with relatively steep sides, and a pivoted lever operatively interconnecting said cam and said plunger for snap-action movement of the latter.

14. Apparatus according to claim 12, wherein said means for reciprocating the plunger comprises a cam shaft, a cam thereon having a rise with relatively steep sides, a lever operatively interconnecting said cam with said plunger, said lever having an arm provided with spaced forks adapted to ride on the circumference of the cam shaft on opposite sides of said cam, a bearing pin between said spaced forks in position to be contacted by said cam rise to provide snap-action movement of said lever and plunger, an eccentric pivot for said lever, and means for adjusting said pivot to alter the beginning and duration of injection.

15. In a fuel pump of the character described, a pump block, a pump cylinder therein, said parts being formed with an inlet communicating with a low pressure fuel source, an outlet leading to a high pressure fuel storage reservoir, and a spill port communicating with a return line to said low pressure fuel source, a pump plunger slidably and rotatably mounted within said cylinder, means for reciprocating said plunger to produce working strokes thereof, a check valve between said inlet and said outlet, said parts being constructed and arranged so that said plunger on its working stroke first closes said inlet to trap fuel in said cylinder and then forces trapped fuel under high pressure past said check valve to said outlet, and thence to said high pressure fuel storage reservoir, said plunger also having an axial internal passage extending from said trapped fuel chamber and communicating with a helical external groove formed thereon and adapted to register with said spill port during the working stroke of said plunger to terminal fuel supply to said high pressure fuel storage reservoir, means for rotating said pump plunger to adjust the time in said working stroke when the helical groove moves into registration with said spill port, and means responsive to fuel pressure within said high pressure fuel storage reservoir for actuating said rotating means.

16. Apparatus according to claim 15, wherein said means for rotating the pump plunger comprises a rack slidably mounted in the pump block, a gear meshing with said rack and operatively connected with said plunger to rotate the latter upon sliding movement of said rack, a control piston responsive to fuel pressure in said high pressure fuel storage reservoir, and operative interconnections between said control piston and said rack.

17. Apparatus according to claim 15, wherein the said means for rotating the pump plunger comprises a rack slidably mounted in said block, a gear meshing with said rack and operatively interconnected with said plunger to rotate the latter upon sliding movement of said rack, a control mechanism including a piston of relatively small cross-sectional area responsive to fuel pressure within said storage reservoir, and an opposed piston of substantially larger cross-sectional area responsive to a substantially constant applied fluid pressure adapted to normally maintain the pistons in equilibrium position, and operative interconnections between said pistons and said rack for producing sliding movement of said rack when said pistons move out of equilibrium position.

18. A unitary fuel pump and timer assembly comprising a pump block and crank case, a cam shaft mounted in said crank case, two spaced fuel pumps mounted in said block in alignment with said cam shaft, each having a cylinder and a reciprocating plunger, connecting passages in said block and pumps constructed and arranged so that said pumps operate in parallel to force fuel from a low pressure source to a high pressure connection adapted to be connected with a reservoir, spaced cams on said cam shaft for reciprocating said pump plungers, said cams being angularly displaced so that said pumps operate alternately, a timer mechanism having a cylinder with reciprocating plunger also mounted in said block intermediate said pumps and offset from alignment with said cam shaft, connecting passages in said block and timer mechanism constructed and arranged so that fuel under high pressure is supplied during the injection period from an inlet adapted to be connected with said reservoir to an outlet adapted to be connected with an injection line, means for reciprocating said timer plunger including a third cam on said cam shaft intermediate said first-mentioned spaced cams and a pivoted lever mounted in said crank case, and means associated with said timer mechanism for controlling the beginning and duration of injection by the reciprocation of said timer plunger.

19. A fuel pump for an internal combustion engine operating with fuel injection and having an injection line, comprising a pump cylinder with plunger operating therein for drawing fuel from a low pressure source and supplying it under high pressure to a fuel flow path, a timer cylinder with a timer plunger operating therein and connected for delivery of high pressure fuel to the engine injection line, a high pressure fuel storage reservoir connected in said fuel flow path intermediate said pump cylinder and said timer cylinder, pressure actuated means responsive to the fuel pressure in said fuel storage reservoir to control the delivery of fuel by said pump plunger to said storage reservoir, a pressure release line, and control means associated with said timer cylinder and timer plunger for connecting, and then disconnecting on each cycle, said fuel storage reservoir with said injection line to thereby control the beginning and duration of injection, and for then promptly connecting said injection line with said pressure release line at the termination of injection.

20. A fuel pump for an internal combustion engine operating with fuel injection and having an injection line, comprising pumping means adapted to be driven in synchronism with the engine for drawing fuel from a low pressure source and supplying it under high injection pressure to a fuel flow path, timing means also adapted to be driven in synchronism with the engine for connecting and then disconnecting said fuel flow path with said injection line to thereby control the beginning and duration of injection on each cycle, a high pressure fuel storage reservoir connected in said fuel flow path intermediate said pumping means and said timing means, pressure responsive means for maintaining a substantially constant high pressure of fuel in said storage reservoir whereby the injection line is supplied with fuel at the substantially constant high injection pressure uninfluenced by surges from said pumping means during each injection period, and additional means for promptly releasing the pressure in said injection line at the termination of injection on each cycle.

KALMAN J. DE JUHASZ.
FREDERICK J. VILLFORTH, JR.

REFERENCES CITED

The following references are of record in the file of this patent:

UNITED STATES PATENTS

| Number | Name | Date |
|---|---|---|
| 2,313,264 | Reggio | Mar. 9, 1943 |
| 2,382,000 | Bremser | Aug. 14, 1945 |